United States Patent Office 2,715,003
Patented Aug. 9, 1955

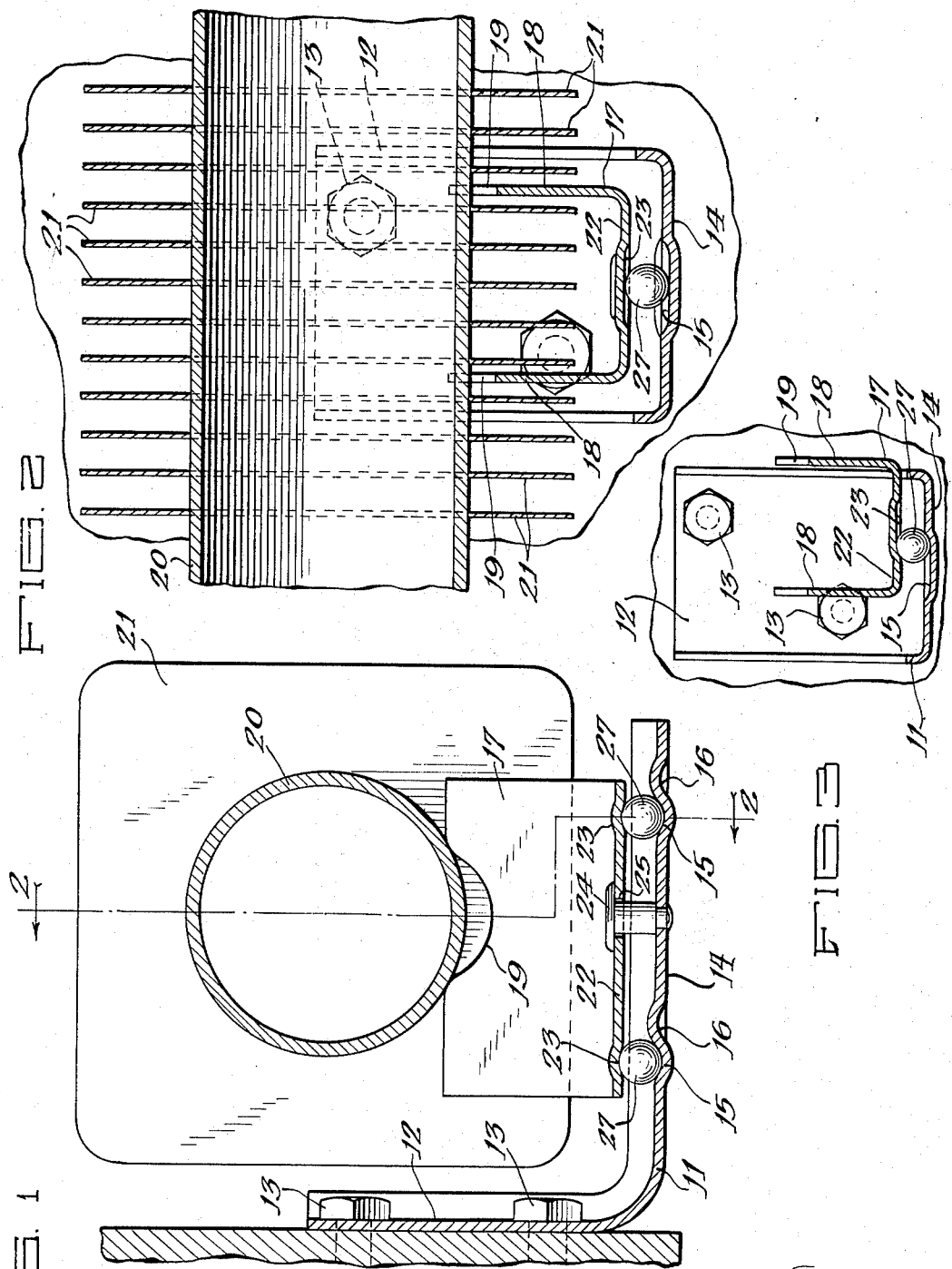

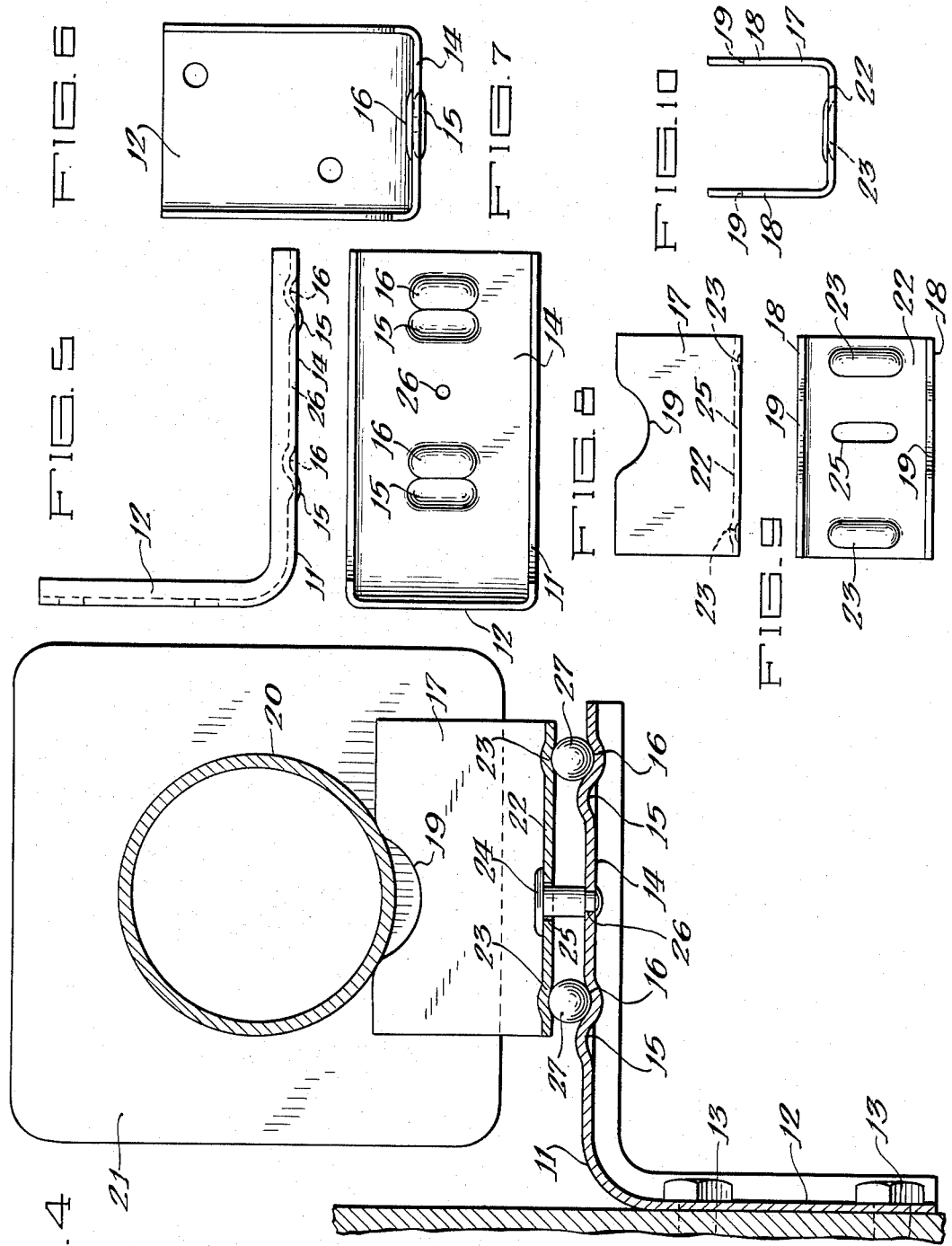

2,715,003

SHIFTABLE BRACKET

Ellis G. Powell, Michigan City, Ind., assignor to C. A. Dunham Company, a corporation of Iowa Application December 9, 1952, Serial No. 324,968

3 Claims. (Cl. 248—55)

This invention relates to a bracket for supporting a pipe or the like, and more particularly to a bracket capable of shiftably supporting a finned heating pipe.

The primary object of this invention is to provide a bracket capable of shifting its support in a direction parallel to the axis of the pipe it is carrying without weakening its attachment to the wall.

A further object is to provide a bracket in which the shifting is accomplished by a rolling movement rather than a sliding one to lessen the strain on the arm of the bracket attached to the wall, and reduce noise when the pipe expands or contracts.

Another object is to provide a bracket lending its support directly to the pipe without interfering with the finned elements.

A further object is to provide a bracket which will support a pipe the same distance from the wall, whether the wall-attaching arm be turned upwardly or downwardly.

Another object of this invention is to provide a shiftable bracket which is strong enough to support and maintain a heating pipe in a single plane, so the pipe will not sag and cause "water hammer."

The invention is illustrated in a preferred embodiment in the accompanying drawings, in which:

Fig. 1 is a vertical sectional view of the bracket supporting a finned heating pipe;

Fig. 2, a sectional view taken as indicated on line 2—2 of Fig. 1;

Fig. 3, a sectional view similar to Fig. 2 without the pipe;

Fig. 4, a vertical sectional view similar to Fig. 1, with the lower support member inverted and the upper member reversed;

Fig. 5, a side elevational view of the lower support member;

Fig. 6, an end elevational view of the lower support member;

Fig. 7, a plan view of the lower support member;

Fig. 8, an elevational view of the upper support member;

Fig. 9, a plan view of the upper support member; and

Fig. 10, an elevational view of the upper support member.

In the embodiment illustrated an L-shaped lower support member 11 preferably is of sheet metal and has an arm 12 which may be attached to a wall or other upright structure by screws 13. The other arm 14 of member 11 has a pair of longitudinal race-ways 15 stamped in one face of the sheet metal arm, and another pair of race-ways 16 stamped in its opposite face, offset from the opposite pair.

The upper support member 17 is a U-shaped cradle with dual arms 18, each having a seat 19 to support a pipe 20. The arms 18 are spaced to extend between finned elements 21 upon the pipe.

The base portion 22 of upper support member 17 is preferably provided with a pair of race-ways 23 spaced to fit over race-ways 15 of the lower support member 11. A headed stud 24 extends freely through a longitudinal slot 25 in the base portion 22 and is shouldered within an opening 26 in lower support member 11 so as to retain the upper member 17 loosely upon the ball bearings 27. The upper member is free to shift longitudinally upon ball bearings 27 in the race-ways 15 and 23, and to rock slightly upon the ball bearings, limited by the stud 24.

The center lines between each pair of race-ways 15, 16 and 23 in the support members are offset an equal distance from the stud 24, and the seats 19 in the upper member are centered over the center line of the stud. Thus when the arm 12 is turned downwardly, as seen in Fig. 4, race-ways 16 of the opposite face of the lower support member are in position to receive the ball bearings 27. If the arm 12 is inverted to the position shown in Fig. 1, the upper support member is reversed so that race-ways 23 will be positioned over race-ways 15.

It will be seen that this supporting bracket can have its arm 12 turned upwardly or downwardly and still support the pipe 20 the same distance from the wall. It will be understood that a bolt can be used in place of the stud 24 so that either arrangement can be selected when the installation is made.

The foregoing detailed description has been given for clearness of understanding only, and no unnecessary limitations should be understood therefrom, for some modifications will be obvious to those skilled in the art.

I claim:

1. A shiftable bracket comprising: an L-shaped sheet metal support member having one leg adapted to be secured to a wall and the other leg having a pair of longitudinally extending ball bearing race-ways in one face and a second pair of race-ways in its opposite face offset from the first set; an upper support member having a pair of race-ways in its lower face spaced for alignment with either pair of race-ways in the L-shaped member; a ball in each upper race-way supporting the upper support member; and retaining means for shiftably securing the upper and lower support members together with the balls engaging one pair of the race-ways in the L-shaped member.

2. A shiftable bracket comprising: an L-shaped sheet metal support member having one leg adapted to be secured to a wall and the other leg having a pair of longitudinally extending ball bearing race-ways in one face and a second pair of race-ways in its opposite face offset from the first set; an upper support member having a pair of race-ways in its lower face spaced for alignment with either pair of race-ways in the L-shaped member; a ball in each upper race-way supporting the upper support member; a longitudinal slot in one of said support members; and a headed stud in the other support member extending through said slot to secure the members together.

3. A shiftable bracket as specified in claim 2, in which the slot and stud are offset from the center lines between both pairs of race-ways in the L-shaped support member.

References Cited in the file of this patent

UNITED STATES PATENTS

| 271,054 | Fowler | Jan. 23, 1883 |
| 1,479,470 | Kuehn | Jan. 1, 1924 |
| 2,070,055 | Levien | Feb. 9, 1937 |
| 2,578,993 | Downs | Dec. 18, 1951 |

FOREIGN PATENTS

| 208,554 | Switzerland | Feb. 15, 1940 |